US012739143B2

(12) United States Patent
Shernan et al.

(10) Patent No.: US 12,739,143 B2
(45) Date of Patent: Sep. 15, 2026

(54) AUTOMATIC NOTE TAKING AND SUMMARY GENERATION BASED ON MEETING DISCUSSIONS

(71) Applicant: Google LLC, Mountain View, CA (US)

(72) Inventors: Ethan Samuel Shernan, Snoqualmie, WA (US); Maryam Sanglaji, Menlo Park, CA (US); Jennifer Shen, Palo Alto, CA (US); Dmitry Denisovich Levin, Sammamish, WA (US); Kristin Moore, Seattle, WA (US); Jan Arvid Kristoffer Callas, San Francisco, CA (US); Anton Volkov, Seattle, WA (US); Yan Liu, Sammamish, WA (US); Lixia Liu, Redmond, WA (US); Daqing Yi, Woodinville, WA (US); Long Ma, Issaquah, WA (US); Jacqueline Amy Tsay, Sunnyvale, CA (US); Yu Mao, Mountain View, CA (US); Deeni Fatiha, San Mateo, CA (US); Anders Thorhauge Sandholm, Hammel (DK); Constance Chin, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/819,797

(22) Filed: Aug. 29, 2024

(65) Prior Publication Data

US 2026/0067118 A1 Mar. 5, 2026

(51) Int. Cl.
*H04L 12/18* (2006.01)
*G06F 40/10* (2020.01)
*G06F 40/35* (2020.01)
*G06N 3/02* (2006.01)

(52) U.S. Cl.
CPC .......... *H04L 12/1831* (2013.01); *G06F 40/10* (2020.01); *G06F 40/35* (2020.01); *G06N 3/02* (2013.01); *H04L 12/18* (2013.01)

(58) Field of Classification Search
None
See application file for complete search history.

(56) References Cited

U.S. PATENT DOCUMENTS

| | | | | |
|---|---|---|---|---|
| 11,095,468 | B1 * | 8/2021 | Pandey | H04L 12/1831 |
| 11,271,978 | B2 * | 3/2022 | Ranalli | H04L 65/4015 |
| 11,509,616 | B2 * | 11/2022 | Bergenlid | H04N 21/4394 |
| 11,522,730 | B2 * | 12/2022 | Asthana | G06F 40/169 |
| 11,741,298 | B1 * | 8/2023 | Polavaram | G06F 40/216 715/727 |
| 11,811,968 | B2 * | 11/2023 | Matias | H04M 3/436 |
| 12,556,651 | B2 * | 2/2026 | Zhu | G06Q 10/10 |

(Continued)

*Primary Examiner* — Jason D Cardone
(74) *Attorney, Agent, or Firm* — Lowenstein Sandler LLP

(57) ABSTRACT

Aspects of the disclosure are directed to automatic note taking and summary generation based on meeting discussions. Media streams that are generated by participants of a virtual meeting can be provided as input data to an artificial intelligence (AI) model. The AI model can use the received input data to take notes on the portion of the virtual meeting that is captured in the input data and to generate a summary of the portion of the virtual meeting that is captured in the input data. The meeting summaries can be provided for presentation to the participants of the virtual meeting at predetermined time intervals.

20 Claims, 8 Drawing Sheets

300

(56) References Cited

U.S. PATENT DOCUMENTS

| | | | | |
|---|---|---|---|---|
| 2015/0142800 | A1* | 5/2015 | Thapliyal | G06F 16/285 707/737 |
| 2019/0132265 | A1* | 5/2019 | Nowak-Przygodzki | H04L 51/02 |
| 2021/0287680 | A1* | 9/2021 | Black | G06F 17/18 |
| 2021/0390144 | A1* | 12/2021 | B M S | G06F 40/35 |
| 2023/0403174 | A1* | 12/2023 | Mohanty | H04L 12/1831 |
| 2023/0419966 | A1* | 12/2023 | Roper | G06F 40/274 |
| 2024/0176960 | A1* | 5/2024 | Maurer | G06F 16/345 |
| 2025/0150295 | A1* | 5/2025 | Siohan | G06Q 10/109 |
| 2025/0317533 | A1* | 10/2025 | Shernan | H04N 7/155 |

* cited by examiner

AUTOMATIC NOTE TAKING AND SUMMARY GENERATION BASED ON MEETING DISCUSSIONS

TECHNICAL FIELD

Aspects and implementations of the present disclosure relate generally to virtual meetings and more specifically to automatic note taking and summary generation based on meeting discussions.

BACKGROUND

A virtual meeting platform can enable users to connect with other users through a video-based or audio-based virtual meeting (e.g., a conference call). The virtual meeting platform can provide tools that allow multiple client devices to connect over a network and share each other's audio streams (e.g., a voice of a user recorded via a microphone of a client device) and/or video streams (e.g., a video captured by a camera of a client device, etc.) for efficient communication.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

An aspect of the disclosure provides a method comprising causing a virtual meeting user interface (UI) to be presented during a virtual meeting between a plurality of participants. The method further comprises receiving, via the virtual meeting UI, a command from a first participant of the plurality of participants to enable automatic note taking. The method further comprises creating, using an artificial intelligence (AI) model and using media streams generated by a plurality of client devices associated with the plurality of participants as input to the AI model, a meeting summary of the virtual meeting. The method further comprises providing the meeting summary to the first participant.

In some implementations, the AI model is trained to generate meeting summaries of virtual meetings using training data comprising media streams associated with past virtual meetings.

In some implementations, a first part of the meeting summary corresponding to a first portion of the virtual meeting is generated based on a first portion of the media streams generated during a first time period. In some implementations, a second part of the meeting summary corresponding to a second portion of the virtual meeting is generated based on the first part of the meeting summary and a second portion of the media streams generated during a second time period.

In some implementations, a first part of the meeting summary corresponding to a first portion of the virtual meeting is generated based on a transcript of the first portion of the virtual meeting, wherein the transcript is generated based on a first portion of the media streams generated during a first time period. In some implementations, a format of the meeting summary is determined based on a transcript of one or more portions of the virtual meeting.

In some implementations, the meeting summary comprises at least one of one or more action items assigned to respective one or more participants of the plurality of participants, a list of topics discussed during the virtual meeting, one or more documents presented via the virtual meeting UI, or one or more portions of a textual chat presented via the virtual meeting UI.

In some implementations, the method further comprises visually rendering the meeting summary via the virtual meeting UI. In some implementations, the method further comprises, responsive to receiving a second command via the virtual meeting UI, hiding the meeting summary from one or more participants of the plurality of participants. In some implementations, the method further comprises determining, using the AI model and using a meeting transcript, that an action item is assigned to the first participant. In some implementations, the method further comprises generating, for the first participant, a task based on the action item.

Another aspect of the disclosure provides a system comprising a memory and a processing device, coupled to the memory, configured to perform operations comprising causing a virtual meeting user interface (UI) to be presented during a virtual meeting between a plurality of participants. The processing device is further configured to perform operations comprising receiving, via the virtual meeting UI, a command from a first participant of the plurality of participants to enable automatic note taking. The processing device is further configured to perform operations comprising creating, using an artificial intelligence (AI) model and using media streams generated by a plurality of client devices associated with the plurality of participants as input to the AI model, a meeting summary of the virtual meeting. The processing device is further configured to perform operations comprising providing the meeting summary to the first participant.

In some implementations, the AI model is trained to generate meeting summaries of virtual meetings using training data comprising media streams associated with past virtual meetings.

In some implementations, a first part of the meeting summary corresponding to a first portion of the virtual meeting is generated based on a first portion of the media streams generated during a first time period. In some implementations, a second part of the meeting summary corresponding to a second portion of the virtual meeting is generated based on the first part of the meeting summary and a second portion of the media streams generated during a second time period.

In some implementations, the meeting summary comprises at least one of one or more action items assigned to respective one or more participants of the plurality of participants, a list of topics discussed during the virtual meeting, one or more documents presented via the virtual meeting UI, or one or more portions of a textual chat presented via the virtual meeting UI.

Another aspect of the disclosure provides a non-transitory computer readable storage medium comprising instructions that, when executed by a processing device, cause the processing device to perform operations comprising causing a virtual meeting user interface (UI) to be presented during a virtual meeting between a plurality of participants. The instructions, when executed, further cause the processing device to perform operations comprising receiving, via the virtual meeting UI, a command from a first participant of the plurality of participants to enable automatic note taking. The instructions, when executed, further cause the processing device to perform operations comprising creating, using an artificial intelligence (AI) model and using media streams generated by a plurality of client devices associated with the plurality of participants as input to the AI model, a meeting summary of the virtual meeting. The instructions, when executed, further cause the processing device to perform operations comprising providing the meeting summary to the first participant.

In some implementations, the AI model is trained to generate meeting summaries of virtual meetings using training data comprising media streams associated with past virtual meetings.

In some implementations, a first part of the meeting summary corresponding to a first portion of the virtual meeting is generated based on a first portion of the media streams generated during a first time period. In some implementations, a second part of the meeting summary corresponding to a second portion of the virtual meeting is generated based on the first part of the meeting summary and a second portion of the media streams generated during a second time period.

In some implementations, the meeting summary comprises at least one of one or more action items assigned to respective one or more participants of the plurality of participants, a list of topics discussed during the virtual meeting, one or more documents presented via the virtual meeting UI, or one or more portions of a textual chat presented via the virtual meeting UI.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
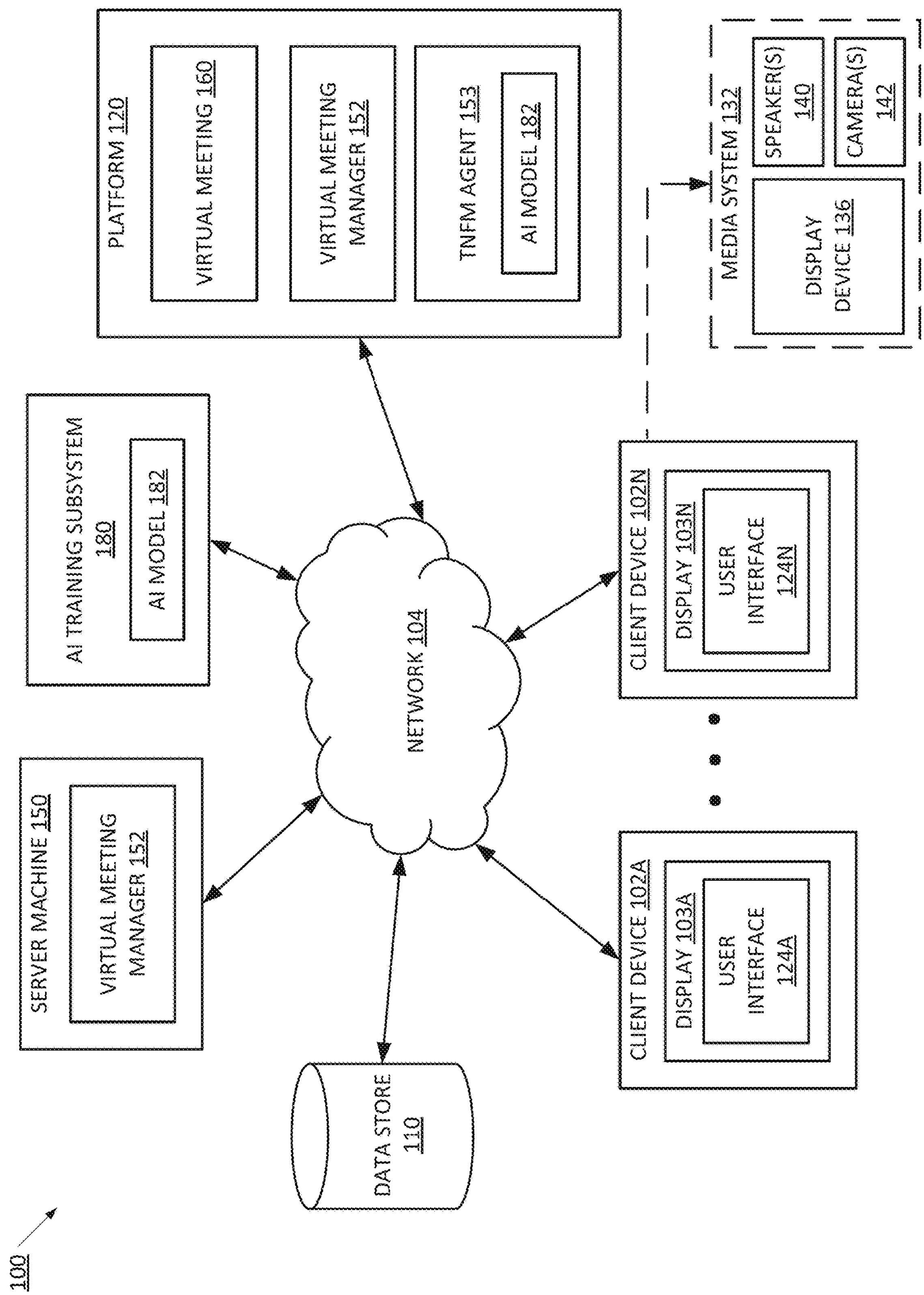
FIG. 1 illustrates an example system architecture, in accordance with implementations of the present disclosure.

Aspects of the present disclosure relate to automatic note taking and summary generation based on meeting discussions. When using conventional virtual meeting platforms to conduct virtual meetings, meeting participants (also referred to herein as users) can manually take notes. Manually taking notes can be burdensome as it causes a user to divide their attention between actively participating in the meeting and memorializing points of interest. Additionally, a user who joins a virtual meeting after the meeting has started can experience confusion related to meeting discussions (e.g., a current topic of discussion, materials being presented during the meeting, whether the user's input was requested prior to the user joining the meeting), and cannot provide input on the points being discussed, resulting in the meeting being less efficient and effective. Users can pose questions to the other meeting participants (e.g., requesting a summary of the meeting thus far, actions items that were discussed and/or assigned), which would require the other users to take notes for the users who joined at later times, causing distraction for the other users and not allowing the other users to fully participate in the meeting. Furthermore, the note-taking users can miss some discussion points or misinterpret the items being discussed. The note-taking users can then need to send the notes to the users who joined at later times (e.g., through email) or may need to have other virtual meetings with those users to provide the requested information, which can use significant computing system resources. Additionally, participating in a large number of virtual meetings can be exhausting for users.

Aspects of the present disclosure address the above and other deficiencies by implementing a take-notes-for-me (TNFM) feature within virtual meeting platforms to automatically take notes on the virtual meeting and generate meeting summaries using each user's audio and/or video streams. The use of the TNFM feature can result in taking notes during a virtual meeting, periodically generating and displaying meeting summaries, and generating a summary document that provides an overview of the virtual meeting. In some implementations, when a user joins a virtual meeting, the user can request, via a virtual meeting user interface (UI) displayed on a client device associated with the user, that the TNFM feature be enabled. The user can select a document within which a comprehensive summary of the meeting should be captured (referred to herein as the summary document). The TNFM feature can be paused and/or disabled at any time during the meeting. The document can be an existing document, such as a summary document from a previous meeting, a document appended to the meeting's calendar invitation, a new document, a meeting agenda, or the like. The comprehensive meeting summary can be used to update corresponding sections of the agenda. In some instances, the document in which the summary is inserted is based on the frequency of the meeting. For example, summaries associated with recurring meetings can be stored in a single document. Users can use a tabbed view of the document such that each tab contains the comprehensive summary of a different iteration of the recurring meeting. In addition to generating the comprehensive summary at the end of the meeting, live summaries can be periodically generated throughout the meeting. The summaries that are periodically generated throughout the meeting may contain basic recaps of the meeting discussions. The comprehensive meeting summary that is generated after the meeting ends may contain a more extensive recap and, for example, a list of action items. In some instances, the summary document can contain portions of a textual chat presented to participants of the virtual meeting via the virtual meeting UI, and/or portions of a Q&A session from the virtual meeting. Therefore, when the TNFM feature is enabled, meeting discussions can be automatically captured and summarized to reduce instances of users having to manually take notes during the meeting.

When the TNFM feature is enabled, an artificial intelligence (AI) model (e.g., a generative AI model) can be used to periodically generate summaries of the meeting and to generate the comprehensive summary of the meeting after the meeting has ended. Each user's media streams can be provided as input to the AI model. In instances where a meeting transcript is generated based on the media streams, the meeting transcript can be provided as input to the AI model. The AI model can perform natural language processing (NLP) on the media streams and/or the meeting transcript to determine the context of a portion of the virtual meeting that is reflected in the media streams and/or the meeting transcript. The AI model can generate a summary of the portion of the virtual meeting (e.g., from time $T_0$ to time $T_1$) that is reflected in the media streams and/or the meeting transcript. The summary can be provided for presentation to all participants of the virtual meeting via the virtual meeting UI.

New media streams can be generated by the participants' client devices as the virtual meeting progresses (e.g., from time $T_1$ to time $T_x$). The new media streams and/or corresponding meeting transcripts can be provided to the AI model as new input data. The AI model can use the new input data to generate a new summary that reflects the portion of the meeting that is captured in the new input data. In some instances, the new summary can summarize the meeting discussions from the time the TNFM feature was enabled to a current time, inclusive (e.g., from time $T_0$ to time $T_2$, where $T_0$ corresponds to a timestamp when the TNFM feature was enabled and $T_2$ corresponds to a current timestamp). In some instances, the new summary can be appended to previously generated summaries. The AI model can generate summaries at predetermined time intervals (e.g., until the TNFM feature is paused or disabled, or the virtual meeting ends).

When the virtual meeting ends or sometime thereafter, the AI model can generate the comprehensive meeting summary that is inserted into the summary document selected by the user when the TNFM feature was enabled. As discussed above, the summary document can contain an overview of the virtual meeting, a list of topics that were discussed during the virtual meeting, a list of action items that were assigned to participants during the virtual meeting, one or more messages from a textual chat associated with the virtual meeting, and/or at least a portion of a Q&A session that was conducted during the virtual meeting. The summary document can be an existing document (e.g., a summary document from a previous meeting, a document that is appended to a calendar invitation associated with the virtual meeting), a new document, an agenda that is associated with the virtual meeting, or the like. When the summary document is a meeting agenda, the elements of the summary document (e.g., the list of discussion topics, the list of action items, the overview of the virtual meeting) can be used to update corresponding sections of the meeting agenda. In some instances, the summary document can be selected based on the frequency of the virtual meeting. For example, a recurring virtual meeting can be associated with a single document that uses a tabbed view to allow users to toggle between individual summary documents that are generated for each iteration of the recurring meeting.

The AI model can use the input data to determine whether an action item is assigned to a user. If action items are assigned to specific users, the AI model can generate a list of action items for each user. The action items assigned to each user can be included in the meeting summaries that are displayed during the meeting and/or in the summary document. The summary document can further include decisions that were made during the meeting. In some instances, the summary document can provide meeting insights that are specific to the user receiving the summary document. The meeting insights can include performance metrics associated with the user, such as a number of times the user participated (e.g., spoke) during the virtual meeting, recommendations for improving participation in future virtual meetings. The summary document can also include documents and/or links to documents that are associated with the virtual meeting (e.g., documents presented during the virtual meeting, documents attached to the virtual meeting's calendar invitation).

The format of the summary document can be customized based on the type of virtual meeting. Specific types of virtual meetings can be associated with specific summary formats that are designed to organize the information captured in the virtual meeting. For example, a summary format that is used to capture information from a board meeting may be different from the summary format that is used to capture information from a team brainstorming meeting. Further, the summary document can be customized based on individual user preferences. In particular, a user can modify preferences associated with the summary document so that the summary document contains more or fewer details about the virtual meeting.

Aspects of the present disclosure provide technical advantages over previous solutions. Aspects of the present disclosure provide an automated process for note taking and summary generation. In this manner, participants do not need to spend time on taking notes and creating summaries during virtual meetings. Such automation improves the user's virtual meeting experience and allows the user to perform other tasks instead of manually taking notes and creating summaries. Aspects of the present disclosure provide a way for a user who is not present during a portion of a virtual meeting to actively participate in the subsequent portions of the virtual meeting. Aspects of the present disclosure provide access to one or more AI-generated summaries of the discussion of the provided discussion points and other materials, which increases the efficiency of the virtual meeting and its participants. Additionally, aspects of the present disclosure reduce the need for a note-taking virtual meeting participant to follow up with the user who missed a portion of a virtual meeting, which reduces the use of computing system resources (e.g., by reducing emails sent from the note-taking participant to the user who missed a portion of the virtual meeting and reducing additional virtual meetings between the note-taking user and the user who missed a portion of the virtual meeting).

FIG. 1 illustrates an example system architecture 100, in accordance with implementations of the present disclosure. The system architecture 100 (also referred to as "system" herein) includes client devices 102A-N (collectively and individually referred to as client device 102 herein), a data store 110, a platform 120, and/or a server machine 150, each connected to a network 104. In implementations, network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more video streams, audio streams, and/or meeting transcripts that can be used to generate meeting summaries (e.g., at predetermined time intervals) and/or to generate the summary document (e.g., at a time after the end of the virtual meeting). Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104.

Platform 120 can enable users of client devices 102A-N to connect with each other via a virtual meeting (e.g., virtual meeting 160). The virtual meeting 160 can be a video-based virtual meeting, which includes a meeting during which a client device 102 connected to platform 120 captures and transmits video streams (e.g., collected by a camera of a client device 102) and/or audio streams (e.g., collected by a microphone of the client device 102) to other client devices 102 connected to platform 120. The video streams can, in some embodiments, depict a user or group of users that are participating in the virtual meeting 160. The audio streams can include, in some embodiments, an audio recording of audio provided by the user or group of users during the virtual meeting 160. In additional or alternative embodiments, the virtual meeting 160 can be an audio-based virtual meeting, which includes a meeting during which a client device 102 captures and transmits audio streams (e.g., without generating and/or transmitting image streams) to other client devices 102 connected to platform 120. In some instances, a virtual meeting can include or otherwise be referred to as a conference call. In such instances, a video-based virtual meeting can include or otherwise be referred to as a video-based conference call and an audio-based virtual meeting can include or otherwise be referred to as an audio-based conference call.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." A client device 102 can include an audiovisual component that can generate audio and video streams to be transmitted to conference platform 120. In some implementations, the audiovisual component can include one or more devices (e.g., a microphone, etc.) that capture an audio streams representing audio provided by the user. The audiovisual component can generate audio data (e.g., an audio file) based on the captured audio stream. In some embodiments, the audiovisual component can additionally or alternatively include one or more devices (e.g., a speaker) that output data to a user associated with a particular client device 102. In some embodiments, the audiovisual component can additionally or alternatively include a video capture device (e.g., a camera) to capture videos streams and generate video data (e.g., a video file) based on the captured video streams.

In some embodiments, one or more client devices 102 can be devices of a physical conference room or a meeting room. Such client devices 102 can be included at or otherwise coupled to a media system 132 that includes one or more display devices 136, one or more speakers 140 and/or one or more cameras 142. A display device 136 can be, or otherwise include, a smart display or a non-smart display (e.g., a display that is not itself configured to connect to platform 120 or other components of system 100 via network 104). Users that are physically present in the conference room or the meeting room can use a media system 132 rather than their own client devices 102 to participate in a virtual meeting, which may include other remote participants. For example, participants in the conference room or meeting room that participate in the virtual meeting may use display device 136 to share a slide presentation with, or watch a slide presentation of, other participants that are accessing the virtual meeting remotely. Sound and/or camera control can similarly be performed. As described above, a client device 102 connected to the media system 132 can generate media streams (e.g., audio and video streams) to be transmitted to platform 120 (e.g., using one or more microphones (not shown), speaker(s) 140 and/or camera(s) 142).

Client devices 102A-N can each include a content viewer, in some embodiments. In some implementations, a content viewer can be an application that provides a user interface (UI) (sometimes referred to as a graphical user interface (GUI)) for users to access the virtual meeting 160 hosted by platform 120. The content viewer can be included in a web browser and/or a client application (e.g., a mobile application, a desktop application, etc.). In one or more examples, a user of client device 102A can join and participate in the virtual meeting 160 via UI 124A presented via display 103A via the web browser and/or client application. A user can also present or otherwise share a document to other participants of the virtual meeting 160 via each of UIs 124A-124N. Each of UIs 124A-124N can include multiple regions that enable presentation of visual items corresponding to video streams of client devices 102A-102N provided to platform 120 during the virtual meeting 160.

In some embodiments, platform 120 can include a virtual meeting manager 152. Virtual meeting manager 152 can be configured to manage the virtual meeting 160 between two or more users of platform 120. In some embodiments, the virtual meeting manager 152 can provide the UI 124 to each of client devices 102 to enable users to watch and listen to each other during a video conference. The virtual meeting manager 152 can also collect and provide data associated with the virtual meeting 160 to each participant of the virtual meeting 160. For example, the virtual meeting manager 152 can provide documents that are associated with the virtual meeting 160 to one or more participants of the virtual meeting 160. Virtual meeting manager 152 can also provide the media streams and/or meeting transcripts associated with the virtual meeting 160 to a take-notes-for-me (TNFM) agent TNFM agent 153.

The TNFM agent 153 can be configured to perform the operations associated with the TNFM feature described above. For example, the TNFM agent 153 can use the media streams and/or meeting transcripts to generate meeting summaries at predetermined time intervals such that the summaries are provided for presentation to the participants of the virtual meeting 160. Further, the TNFM agent 153 can use the media streams and/or meeting transcripts to generate the summary document that includes the overview of the virtual meeting 160. The TNFM agent 153 can use AI model 182 trained by AI training subsystem 180 to generate the meeting summaries at predetermined time intervals and the summary document, as discussed herein.

The AI model 182 can analyze the received media streams and/or meeting transcripts to determine a context of a meeting discussion that is captured in at least one of the media streams and/or meeting transcripts. The AI model 182 can summarize the context of the meeting discussion based on the received media streams and/or meeting transcripts. Additionally, the AI model 182 can generate the summary document (e.g., when the virtual meeting 160 ends) based on the received media streams, the meeting transcripts, and/or the meeting summaries that are generated at predetermined time intervals. To generate the summary document, the AI model 182 can use the received media streams, the meeting transcripts, and/or the meeting summaries that are generated at predetermined time intervals to identify points of discussion during the virtual meeting 160, generate a list of discussion points, generate a list of actions that were assigned during the virtual meeting 160, generate specific action item tasks for specific participants, or the like. The AI model 182 can extract (e.g., from one or more meeting transcripts) messages that were exchanged between participants via a textual chat feature of the virtual meeting 160 and/or discussions during a Q&A session of the virtual meeting 160. In some implementations, the messages from the chat feature and/or the Q&A discussions can be also included in the summary document, as will be discussed in more detail herein.

As described above, the AI model 182 can output summaries of the virtual meeting 160 at predetermined time intervals. The virtual meeting manager 152 can obtain the one or more outputs of the AI model 182 and provide the meeting summaries for presentation via a user interface (e.g., user interface 124A of client device 102A) during the virtual meeting 160. The AI model 182 can also output the summary document (e.g., when the virtual meeting 160 terminates). In some instances, the virtual meeting manager 152 can obtain the summary document output of the AI model and deliver to summary document to the participants of the virtual meeting 160 (e.g., via e-mail).

It should be noted that although FIG. 1 illustrates the virtual meeting manager 152 and the TNFM agent 153 as part of platform 120, in additional or alternative embodiments, virtual meeting manager 152 and/or the TNFM agent 153 can reside on one or more server machines that are remote from platform 120 (e.g., server machine 150). It should be noted that in some other implementations, the functions of platform 120, server machine 150 and/or predictive system 180 can be provided by more or a fewer number of machines. For example, in some implementations, components and/or modules of platform 120, server machine 150 and/or predictive system 180 may be integrated into a single machine, while in other implementations components and/or modules of any of platform 120, server machine 150 and/or predictive system 180 may be integrated into multiple machines. In addition, in some implementations, components and/or modules of server machine 150 and/or predictive system 180 may be integrated into platform 120.

In general, functions described in implementations as being performed by platform 120, server machine 150, and/or AI training subsystem 180 can also be performed on the client devices 102A-N in other implementations. In addition, the functionality attributed to a particular component can be performed by different or multiple components operating together. Platform 120 can also be accessed as a service provided to other systems or devices through appropriate application programming interfaces.

Although implementations of the disclosure are discussed in terms of platform 120 and users of platform 120 accessing the virtual meeting 160 hosted by platform 120, implementations of the disclosure are not limited to conference platforms and can be extended to any type of virtual meeting.

In implementations of the disclosure, a "user" can be represented as a single individual. However, other implementations of the disclosure can describe a "user" as an entity controlled by a set of users and/or an automated source. For example, a set of individual users federated as a community in a social network can be considered a "user." In another example, an automated consumer can be an automated ingestion pipeline of platform 120.

In situations in which the systems discussed here collect personal information about users, or can make use of personal information, the users can be provided with an opportunity to control whether the virtual meeting platform 120, the virtual meeting manager 152, or the TNFM agent 153 collects user information (e.g., information about a user's social network, social actions or activities, profession, a user's preferences, or a user's current location), or to control whether or how to receive content from the virtual meeting platform 120 or the virtual meeting manager 152 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the virtual meeting platform 120 or the virtual meeting manager 152.

Figure 2:
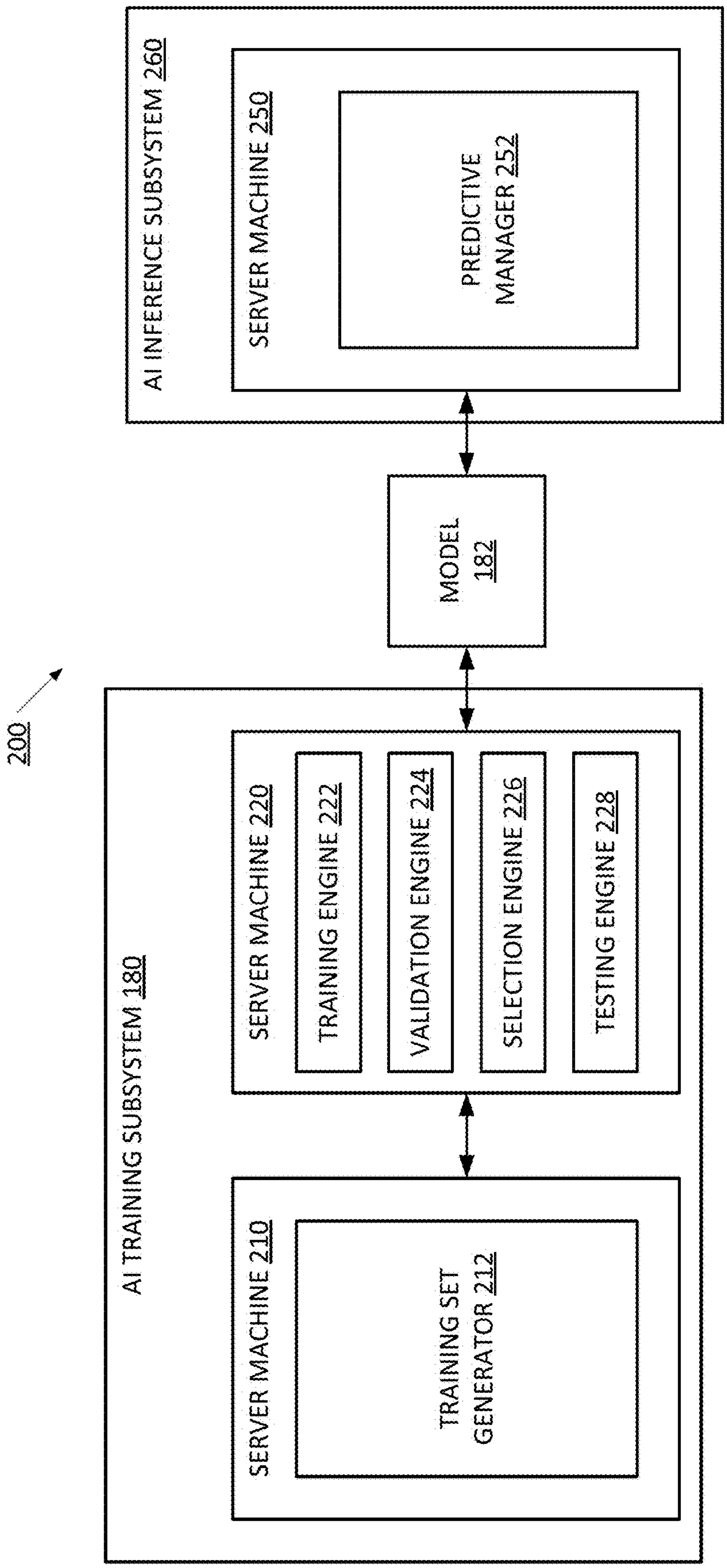
FIG. 2 illustrates an example predictive system, in accordance with implementations of the present disclosure.

FIG. 2 illustrates an example predictive system, in accordance with implementations of the present disclosure. As illustrated in FIG. 2, predictive system 200 can include AI training subsystem 180 and AI inference subsystem 260. AI training subsystem 180 can include a training set generator 212, a training engine 222, a validation engine 224, a selection engine 226, and/or a testing engine 228. AI inference subsystem 260 can include a predictive manager 252. In some implementations, the AI training subsystem 180 is hosted by a single server machine. Alternatively, the AI training subsystem 180 is hosted by multiple server machines (e.g., server machine 210 and server machine 220). In some implementations, the AI inference subsystem 260 is hosted by the same server machine(s) as the AI training subsystem 180. Alternatively, the AI inference subsystem 260 is hosted by a server machine(s) other than server machine(s) that host the AI training subsystem 180.

Training set generator 212 may be capable of generating training data (e.g., a set of training inputs and a set of target outputs) to train model 182. Model 182 can include an artificial intelligence (AI) model.

The training set generator 212 can generate training data for training the model 182. The training set generator 212 can initialize a training set T to null (e.g., { }). The training set generator 212 can identify media streams generated by one or more participants of historical virtual meetings (e.g., previously conducted virtual meetings). The training set generator 212 can determine, for each historical virtual meeting, a context of a portion of the historical virtual meeting based on the corresponding media streams. In other or similar embodiments, the training set generator 212 can generate a meeting transcript that corresponds to the media streams. The training set generator 212 can use the meeting transcript to determine the context of the portion of the historical virtual meeting that is captured in the meeting transcript.

In some instances, the training set generator 212 can receive input (e.g., manually generated input) that indicates the context of the portion of the historical virtual meeting based on at least one of the media streams and/or the meeting transcript associated with the historical virtual meeting. Further, the training set generator 212 can receive input (e.g., manually generated input) that includes a summary of the portion of the historical virtual meeting based on the determined context of the portion of the historical virtual meeting. The training set generator 212 can generate input/output mappings based on the received input (e.g., media streams, meeting transcripts, manually determined context of portions of the media streams and/or meeting transcripts) and a corresponding output (e.g., summaries of historical virtual meetings based on the received input).

Training set generator 212 can add the input/output mappings to the training set T and can determine whether training set T is sufficient for training the model 182. Training set T can be sufficient for training the model 182 if training set T includes a threshold amount of input/output mappings, in some embodiments. In response to determining that training set T is not sufficient for training, the training set generator 212 can identify additional and/or different media streams and/or corresponding meeting transcripts. In response to determining that training set T is sufficient for training, training set generator 212 can provide training set T to model 182. In some embodiments, training set generator 212 can provide the training set T to training engine 222.

Training engine 222 can train model 182 using the training data (e.g., training set T) from training set generator 212. In some embodiments, the model 182 can be an artificial intelligence (AI) model. The model 182 can refer to the model artifact that is created by the training engine 222 using the training data that includes training inputs and/or corresponding target outputs (correct answers for respective training inputs). The training engine 222 can find patterns in the training data that map the training input (e.g., media streams, meeting transcripts, manually determined context of portions of the media streams and/or meeting transcripts) to the target output (e.g., summaries of historical virtual meetings based on the received input). The model 182 can include one or more of decision trees, random forests, support vector machines, or other types of machine learning models. In one embodiment, such AI models may include one or more artificial neural networks (also referred to simply as a neural network). The artificial neural network can include a feature representation component with a classifier or regression layers that map features to a target output space. The artificial neural network may be, for example, a convolutional neural network (CNN) that can include a feature representation component with a classifier or regression layers that map features to a target output space, and can host multiple layers of convolutional filters. Pooling can be performed, and non-linearities may be addressed, at lower layers, on top of which a multi-layer perceptron can be commonly appended, mapping top layer features extracted by the convolutional layers to decisions (e.g., classification outputs). The neural network may further be a deep network with multiple hidden layers or a shallow network with zero or a few (e.g., 1-2) hidden layers. Deep learning may use a cascade of multiple layers of nonlinear processing units for feature extraction and transformation. Each successive layer can use the output from the previous layer as input. In deep learning, each level learns to transform its input data into a slightly more abstract and composite representation.

In some embodiments, the model 182 may include one or more of artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron can be connected to one or more neurons via one or more edges ("synapses"). The synapses can perpetuate a signal from one neuron to another, and a weight, bias, or other configuration of a neuron or synapse can adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities can be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of neural network that includes a memory to enable the neural network to capture temporal dependencies. An RNN is able to learn input-output mappings that depend on both a current input and past inputs. The RNN can address past and future measurements and make predictions based on this continuous measurement information. One type of RNN that may be used is a long short term memory (LSTM) neural network. ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In some embodiments, the model 182 can include at least one generative AI model, such as a large language model (LLM) allowing for the generation of new and original content. A generative AI model can deviate from a machine learning model based on the generative AI model's ability to generate new, original data, rather than making predictions based on existing data patterns. A generative AI model may include a generative adversarial network (GAN), a variational autoencoder (VAE), a large language model (LLM), or a diffusion model. In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models can also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some implementations, an AI model 182 is an AI model that has been trained on a corpus of data. For example, the AI model 182 can be an AI model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model 182 to learn broad elements including, image or speech recognition, general sentence structure, common phrases, vocabulary, natural language structure, and other elements. In some implementations, this first foundational model is trained using self-supervision, or unsupervised training on such datasets.

In some implementations, the second portion of training, including fine-tuning, includes unsupervised, supervised, reinforced, or any other type of training. In some implementations, this second portion of training includes some elements of supervision, including learning techniques incorporating human or machine-generated feedback, undergoing training according to a set of guidelines, or training on a previously labeled set of data, etc. In a non-limiting example associated with reinforcement learning, the outputs of the AI model 182 while training can be ranked by a user, according to a variety of factors, including accuracy, helpfulness, veracity, acceptability, or any other metric useful in the fine-tuning portion of training. In this manner, the AI model 182 can learn to favor these and any other factors relevant to users when generating a response. Further details regarding training are provided below.

In some implementations, an AI model 182 includes one or more pre-trained models, or fine-tuned models. In a non-limiting example, in some implementations, the goal of the “fine-tuning” can be accomplished with a second, or third, or any number of additional models. For example, the outputs of the pre-trained model can be input into a second AI model that has been trained in a similar manner as the “fine-tuned” portion of training above. In such a way, two more AI models can accomplish work similar to one model that has been pre-trained, and then fine-tuned.

In one implementation, the AI training subsystem 180 manages the training and testing of AI model 180. The training set generator 212 can generate training data. In some embodiments, the training data may include textual content. The textual content may include one or more virtual meeting transcripts (e.g., one or more virtual meeting transcripts)). The textual content can include other types of text data, such as text documents on various subjects, chat messages entered during a virtual meeting, etc. The training engine 222 can use the textual content training data to train a generative AI model 182 to generate one or more summaries of a virtual meeting 160. In some implementations, the training engine 222 can use the textual content training data to train a generative AI model 182 to generate action item tasks for a user.

In some implementations, the training data can include audio data. The audio data may include data that includes a recording of a person speaking. The audio data may include one or more phonemes, word fragments, words, sentences, or other portions of speech. Each piece of audio training data may include a corresponding target out that includes a text representation of the audio data of the audio training data. The training engine 222 can use the audio training data to train a speech-to-text AI model 182 configured to generate a transcript of a virtual meeting 160.

In some embodiments, the training data may include media streams of past virtual meetings. The training engine 222 can use the media streams of the past virtual meetings to train a generative AI model 182 to generate one or more summaries of a virtual meeting 160.

Where the AI model 182 uses supervised learning, the training engine 222 can assist the AI model 182 in determining whether the AI model 182 maps the training input to the target output. Where the AI model 182 uses unsupervised learning, the training engine 222 can input the training data into the AI model 182. The AI model 182 can configure itself based on the input training data, but since the training data may not include a target output, the training engine 222 may not assist the AI model 182 in determining whether the AI model 182 provided a correct output during the training process.

Validation engine 224 can validate a trained model 182 using a corresponding set of features of a validation set from training set generator 212. The validation engine 224 can determine an accuracy of the model 182 based on the corresponding sets of features of the validation set. Where the training data may not include a target output, validating a trained AI model 182 may include obtaining an output from the AI model 182 and providing the output to another entity for evaluation. The other entity may include another AI model configured to evaluate the output of the AI model 182 that is undergoing training. The other entity may include a human. In some embodiments, the training data can be used to train a plurality of models 182. The validation engine 224 can discard a trained model 182 that does not meet a threshold accuracy. In some embodiments, the selection engine 226 can select a trained model that meets the threshold accuracy. In some embodiments, the selection engine 326 can select the trained model 182 that has the highest accuracy of the trained models 260.

The testing engine 228 can test a trained model 182 using a corresponding set of features of a testing set from training set generator 212. The testing engine 228 can test each trained model using the training set that was used to train the model. For example, a first model that was trained using a first set of features of the training set may be tested using the first set of features of the testing set. The testing engine 228 can determine a trained model that has the highest accuracy of all of the trained models based on the testing sets.

Once the AI model 182 is trained, it can be used predictive manager 252 to periodically generate summaries of the virtual meeting 160 and to generate the comprehensive summary of the virtual meeting 160 after the meeting has ended. In some implementations, each virtual meeting participant’s audio and/or video streams are fed into the AI model 182. In some instances, the audio and/or video streams are used to generate a meeting transcript, which is fed into the AI model 182. The AI model 182 can perform NLP on the audio and/or video streams and/or the virtual meeting transcript. The AI model 182 can analyze the audio and/or video streams to generate a virtual meeting summary.

As more audio and/or video streams are fed to the AI model 182, the virtual meeting summary can be periodically updated.

After the meeting is terminated, the AI model 182 can generate the comprehensive meeting summary that can be inserted into a document selected by a user when the TNFM feature was enabled. The summary document can contain data such as the comprehensive summary of the meeting, bullet points that capture different sections of the meeting, a list of action items to be completed and/or updated after the meeting, the contents of the meeting's chat feature. The AI model 182 can use the meeting transcript to determine whether an action item was assigned to a user. If one or more action items were assigned to the user, the AI model 182 can generate action item tasks for the user. The action item tasks can be presented on the live summaries that are displayed during the meeting and/or can be included in the comprehensive meeting summary. In some instances, the summary document can indicate decisions that were made during the meeting and provide meeting insights that are specific to the user receiving the summary document. The meeting insights can include a number of times that the user spoke during the meeting and/or recommendations for improving participation in meetings. The comprehensive meeting summary can also include documents pertaining to the meeting, such as documents presented during the meeting, documents attached to the meeting's calendar invitation, or the like.

Figure 3:
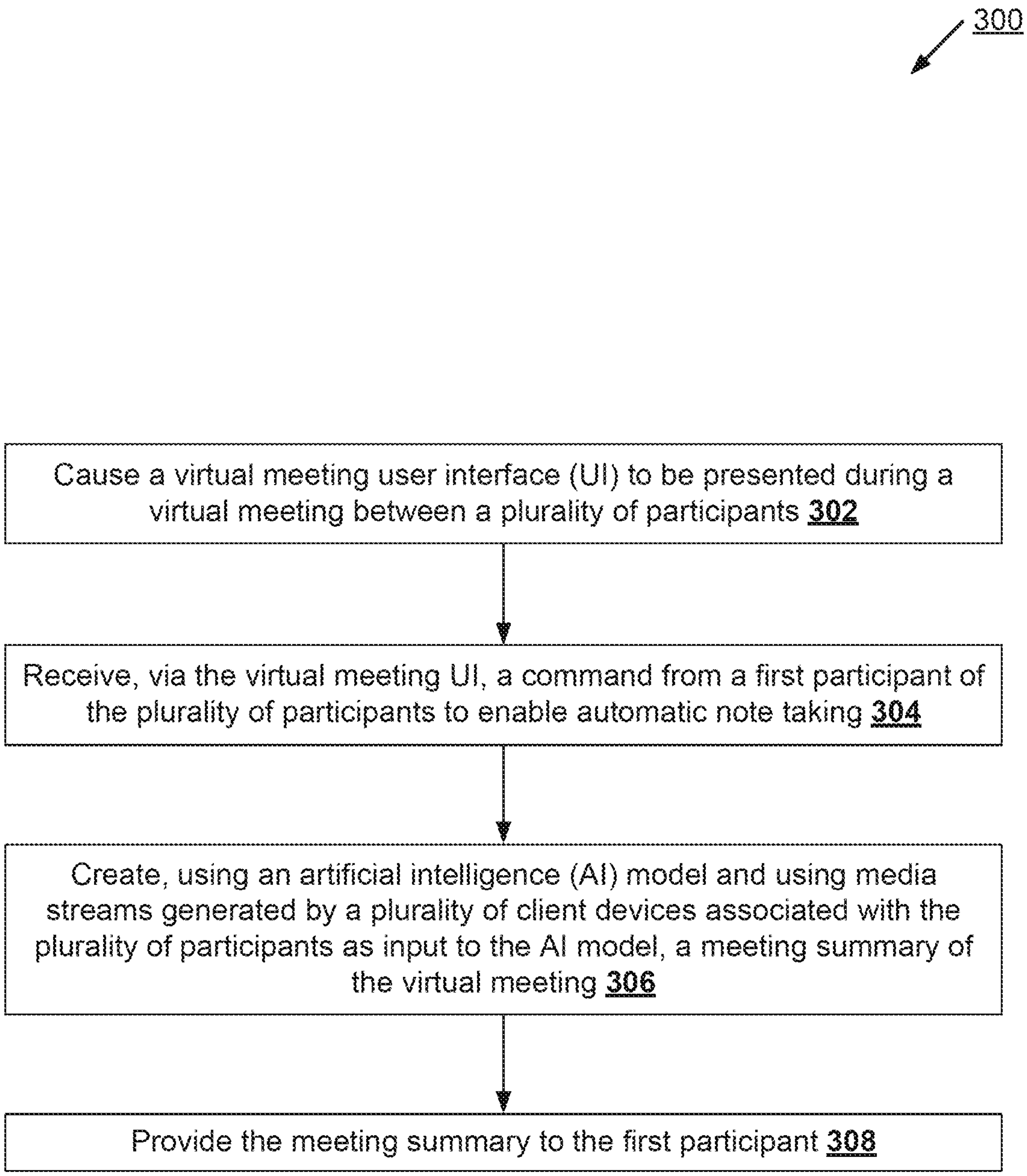
FIG. 3 depicts a flow diagram of an example method for automatic note taking and summary generation based on meeting discussions, in accordance with implementations of the present disclosure.

FIG. 3 depicts a flow diagram of an example method for automatic note taking and summary generation based on meeting discussions, in accordance with implementations of the present disclosure. Method 300 can be performed by processing logic that can include hardware (e.g., circuitry, dedicated logic, etc.), software (e.g., instructions run on a processing device), or a combination thereof. In one implementation, some or all the operations of method 300 can be performed by one or more components (e.g., virtual meeting manager 152 and/or TNMF agent 153) of system 100 of FIG. 1. In some embodiments, some or all of the operations of method 300 can be performed by platform 120, server machine 150, and/or client device 102, as described herein.

At operation 302, the processing logic can cause a virtual meeting user interface (UI) to be presented during a virtual meeting between a plurality of participants.

Figure 4:
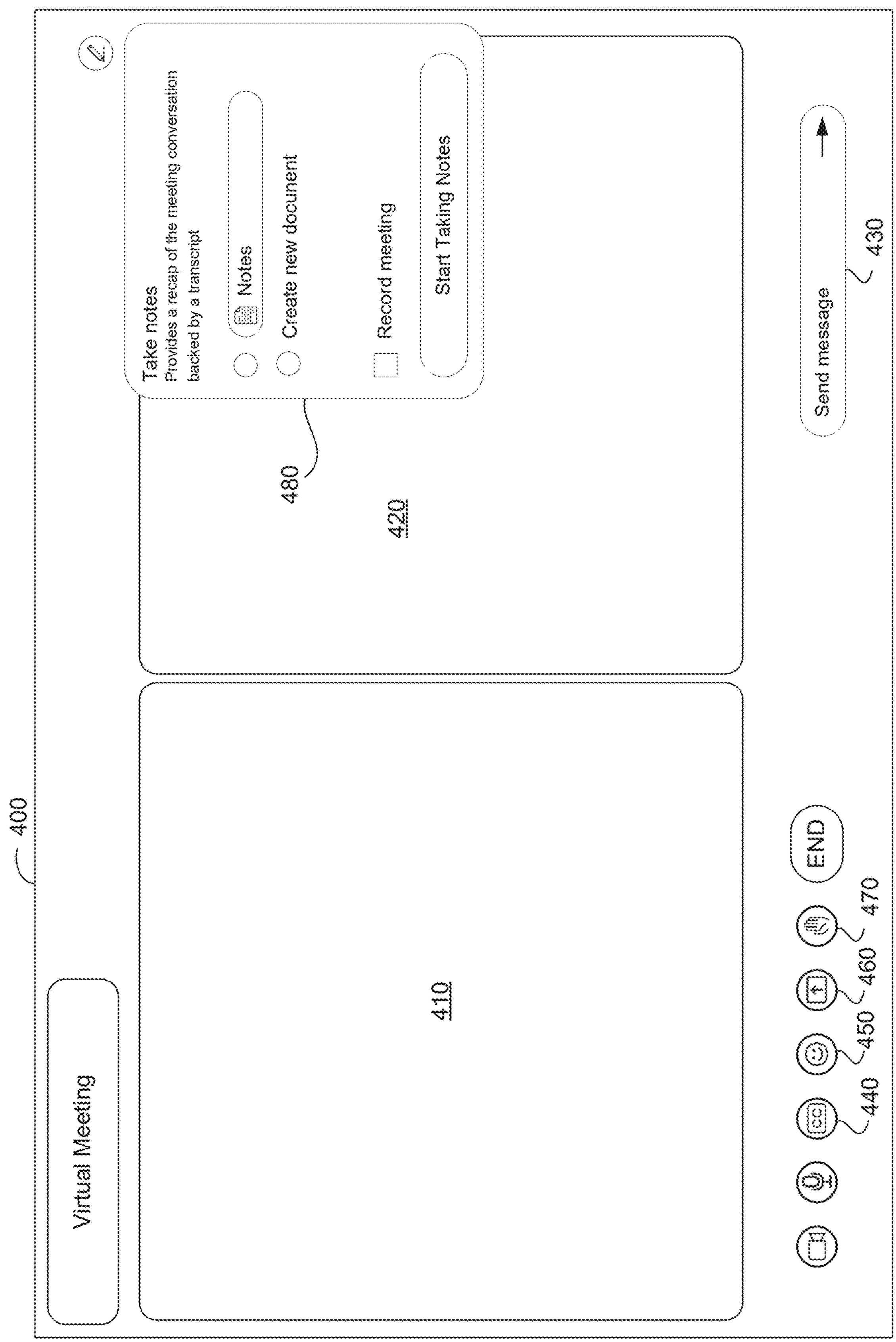
FIG. 4 illustrates an example virtual meeting user interface presenting features related to automatic note taking, in accordance with implementations of the present disclosure.

FIG. 4 illustrates an example virtual meeting UI presenting features related to automatic note taking, in accordance with implementations of the present disclosure. The virtual meeting UI (e.g., virtual meeting UI 400) can be provided for presentation to the plurality of participants via a plurality of client devices (e.g., client devices 102A-102N) associated with the plurality of participants. The virtual meeting UI can be used to present visual items corresponding to media streams associated with each meeting participant. For example, visual items 410, 420 correspond to and visually represent media streams associated with meeting participants. Specifically, each participant's video stream (e.g., captured via a camera of the client device associated with the participant) and/or audio stream (e.g., captured via one or more speakers of the client device associated with the participant) can be represented via a respective visual item in the virtual meeting UI 400 that is provided for display to each participant of the virtual meeting. In some instances, the virtual meeting UI 400 can include a textual chat feature (e.g., textual chat feature 430) that enables participants of the virtual meeting to send and/or receive textual chat messages to and/or from other participants. The virtual meeting UI 400 can include one or more virtual meeting features that participants can enable/use (e.g., closed captioning 440, emoji reactions 450, screen sharing 460, hand raising 470 to signal that a participant has a question, the TNFM feature 480, etc.). The virtual meeting UI 400 can also include features related to automatic note taking such a TNFM feature 480.

Returning to FIG. 3, at operation 304, the processing logic can receive, via the virtual meeting UI, a command from a first participant of the plurality of participants to enable automatic note taking. For example, the processing logic can receive user input (e.g., via a peripheral device coupled to a client device associated with the user) via the virtual meeting UI 400 to enable the TNFM feature 480. In some instances, the user input can indicate an existing document (referred to herein as the summary document) or a new document within which the automatically generated meeting notes, meeting summaries, and/or the meeting overview can be stored.

At operation 306, the processing logic can create a meeting summary of the virtual meeting using an artificial intelligence (AI) model and using media streams generated by a plurality of client devices associated with the plurality of participants. The processing logic can automatically take notes throughout the meeting. In some instances, the notes can be provided for display via the virtual meeting UI 400.

Figure 5:
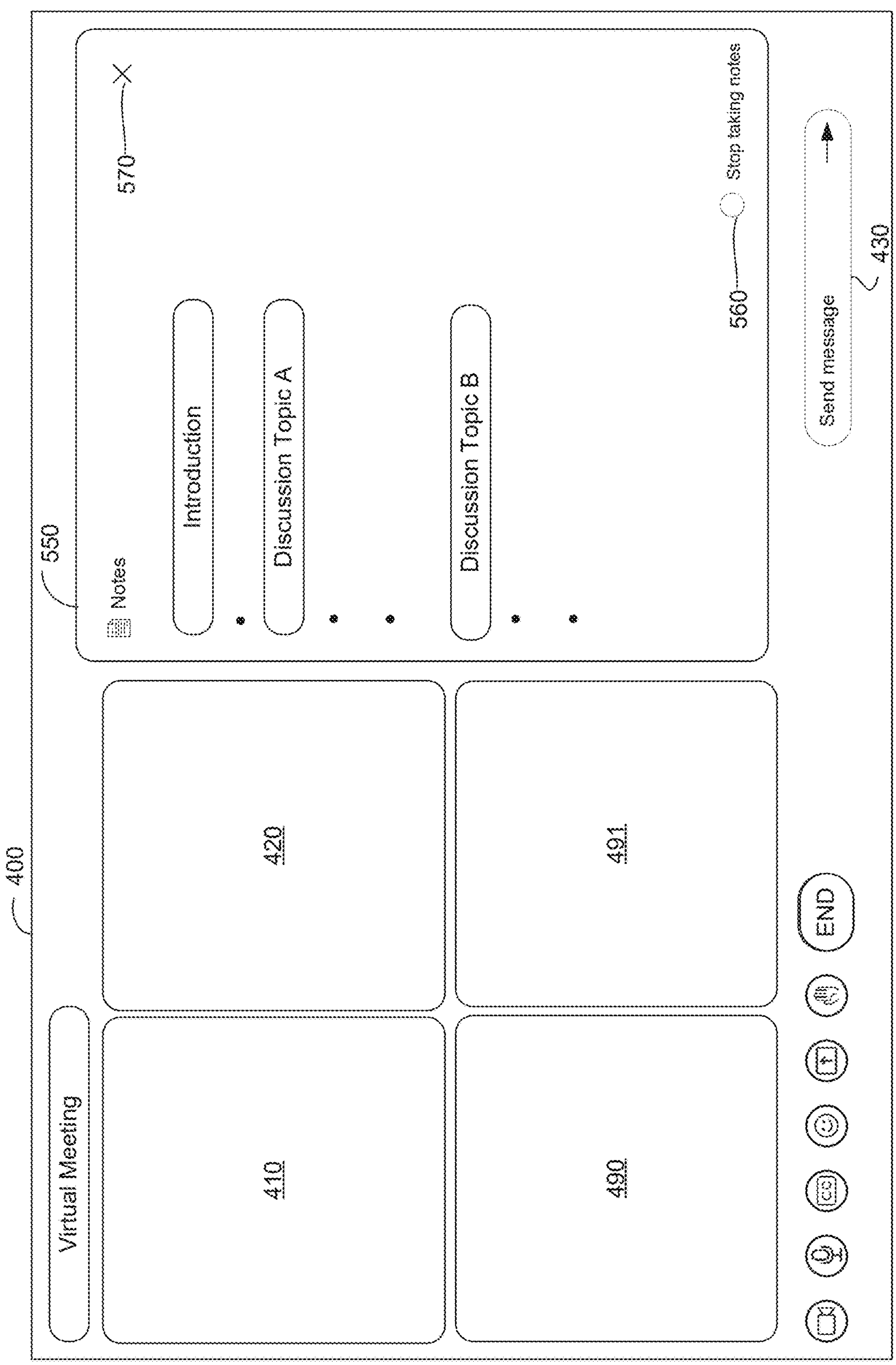
FIG. 5 illustrates an example virtual meeting user interface comprising automatically generated virtual meeting notes, in accordance with implementations of the present disclosure.

FIG. 5 illustrates an example virtual meeting user interface comprising automatically generated virtual meeting notes, in accordance with implementations of the present disclosure. As illustrated in FIG. 5, the virtual meeting UI 400 presents visual items 410, 420, 490 and 491 that correspond to and visually represent media streams associated with meeting participants, and the automatically generated notes (e.g., via an automatic note taking feature 550). In some instances, meeting participants can edit (e.g., add, remove, modify, etc.) the automatically generated notes. In such instances, the UI 400 including the automatic note taking feature 550 can identify one or more users that edit the automatically generated notes using one or more cursor representations that are unique to the one or more users. The one or more cursor representations can be provided for display to the meeting participants via the automatic note taking feature 500 of the virtual meeting UI 400. The user can terminate automatic note taking at any time during the virtual meeting. For example, based on receiving user input (e.g., via a peripheral device coupled to a client device associated with the user) via a UI element (e.g., button 560) associated with automatic note taking feature 550, the processing device can stop taking notes. Additionally or alternatively, the user can hide the automatically generated notes from presentation on the virtual meeting UI 400. For example, based on receiving user input (e.g., via a peripheral device coupled to a client device associated with the user) via a UI element such as button 570 associated with automatic note taking feature 550, the processing logic can cause the notes to be no longer visible on the UI 400.

Returning to FIG. 3, each participant's media streams can be provided as input data to the AI model (e.g., model 182). In some instances, the processing logic can use the media streams to generate a meeting transcript that captures the portion of the virtual meeting that corresponds to the media streams. In such instances, the meeting transcript can also be provided as input data to the AI model. The AI model can analyze the input data to determine the context of the meeting discussions that are captured in the input data. For example, based on the analysis of the input data, the AI model can determine one or more topics discussed during the portion of the virtual meeting associated with the input data, one or more action items assigned during the portion of the virtual meeting, etc. The AI model can generate a summary of the portion of the virtual meeting based on the input data. The summary can be based on the determined context of the meeting discussions that are captured in the input data. The AI model can generate meeting summaries at predetermined time intervals (e.g., every five minutes, ten minutes, hour, two hours, etc.).

Figure 6:
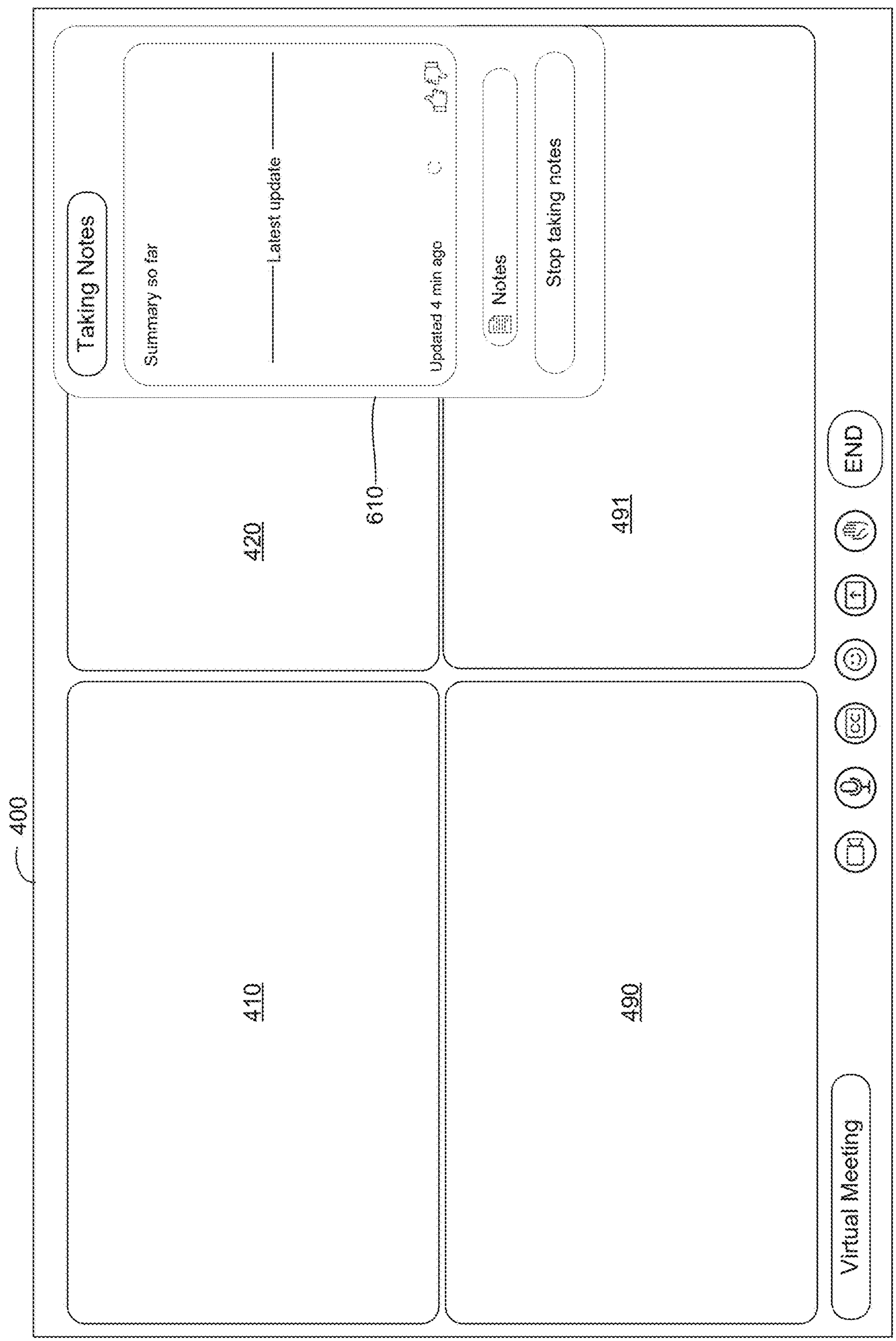
FIG. 6 illustrates an example virtual meeting user interface comprising automatically generated live meeting summaries, in accordance with implementations of the present disclosure.

FIG. 6 illustrates an example virtual meeting user interface comprising automatically generated live meeting summaries, in accordance with implementations of the present disclosure. As illustrated in FIG. 6, the virtual meeting UI 400 presents visual items 410, 420, 490 and 491 that correspond to and visually represent media streams associated with meeting participants, and the meeting summaries 610 that are generated during predetermined time intervals.

Returning to FIG. 3, the AI model can generate a meeting summary based on a totality of input data received. For example, in a first predetermined time interval, the meeting summary can be based on the input data that is provided to the AI model during the first predetermined time interval. In a second predetermined time interval, the meeting summary can be based on the input data that is provided to the AI model during the first predetermined time interval and the second predetermined time interval. Additionally or alternatively, the meeting summary that is generated during the second predetermined time interval can be based only on the input data that is provided to the AI model during the second predetermined time interval.

In some instances, the meeting summary that is generated by the AI model can correspond to an overview of the virtual meeting. In such instances, the meeting summary can be stored in the summary document (e.g., that was selected by the user when the TNFM feature was enabled) that is generated when the virtual meeting ends or sometime thereafter.

Figure 7:
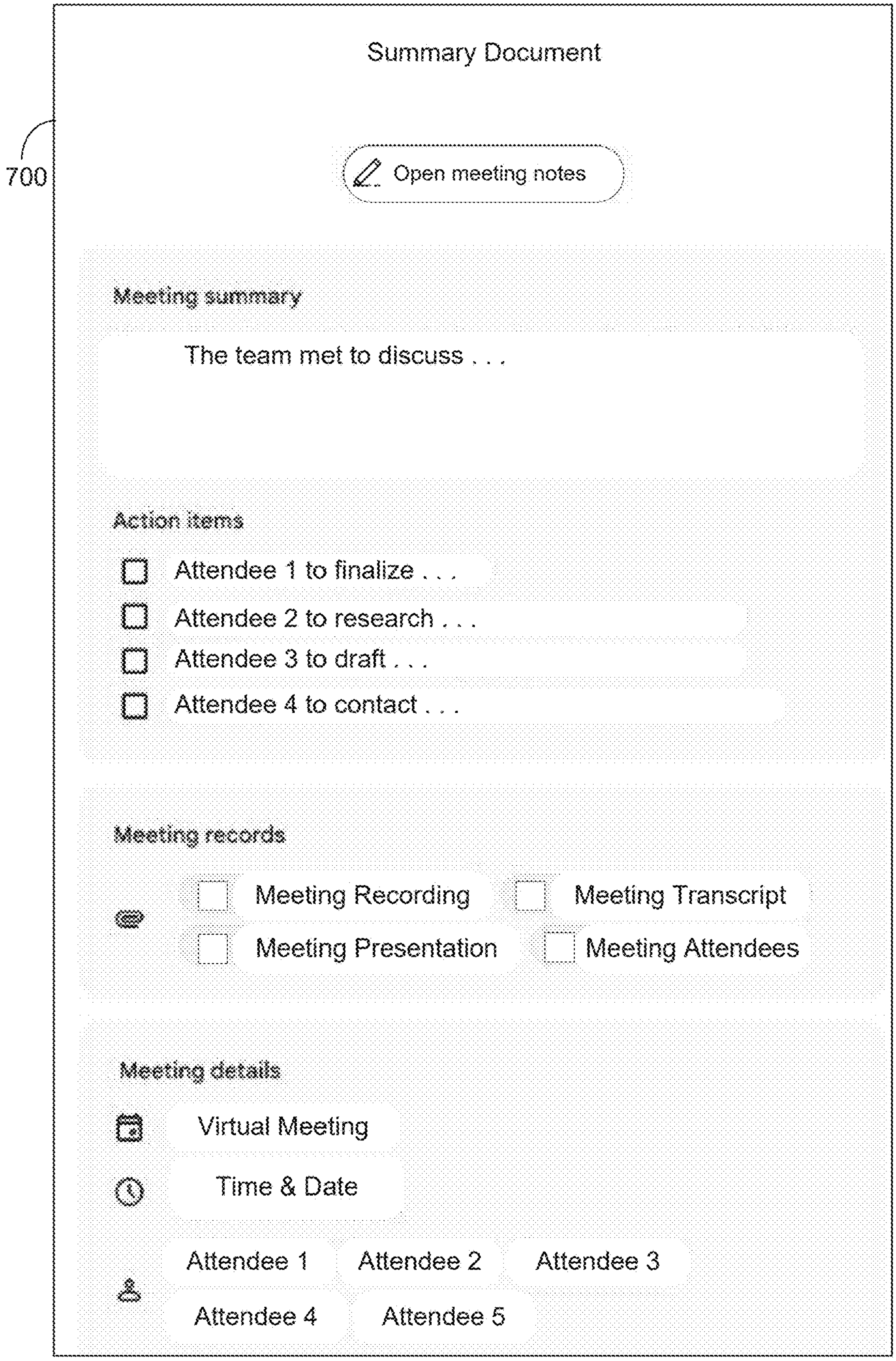
FIG. 7 illustrates an example summary document automatically generated for a virtual meeting, in accordance with implementations of the present disclosure.

FIG. 7 illustrates an example summary document 700 automatically generated for a virtual meeting, in accordance with implementations of the present disclosure. The summary document 700 can include a comprehensive overview of the virtual meeting. In some instances, the comprehensive overview can be based on the meeting summaries that are generated at the predetermined time intervals. The summary document can include a list (e.g., a bulleted list) of events that occurred during the virtual meeting (e.g., topics that were discussed, actions items that were assigned, materials that were presented). In instances where messages were shared in the textual chat associated with the virtual meeting, the summary document can include one or more of the messages. The summary document can also include questions and answers from a Q&A portion of the virtual meeting. In some instances, the summary document can include decisions that were made during the meeting. Additionally or alternatively, the summary document can include one or more resources associated with the virtual meeting, such as a meeting recording, a meeting transcript, documents presented during the meeting, and/or a list of meeting attendees. Further, in some instances, the summary document can include meeting insights that correspond to the specific user receiving the summary document. The meeting insights associated with the specific user can indicate, for example, a number of time the specific user participated in the virtual meeting and/or recommendations for improving meeting participation.

Returning to FIG. 3, at operation 308, the processing logic can provide the meeting summary to the first participant. When the meeting summary is generated at a predetermined time interval, the meeting summary can be provided for presentation (e.g., visually) via the virtual meeting UI (e.g., the virtual meeting UI 400). The first participant can view the meeting summary via a client device (e.g., client device 102A) associated with the first participant. Additionally or alternatively, the meeting summary can correspond to the overview of the virtual meeting that is stored in the summary document. The summary document (e.g., the summary document 700) can be provided to the first participant at the end of the virtual meeting or sometime thereafter via, for example, e-mail. In such instances, the first participant can receive an e-mail containing the summary document.

Figure 8:
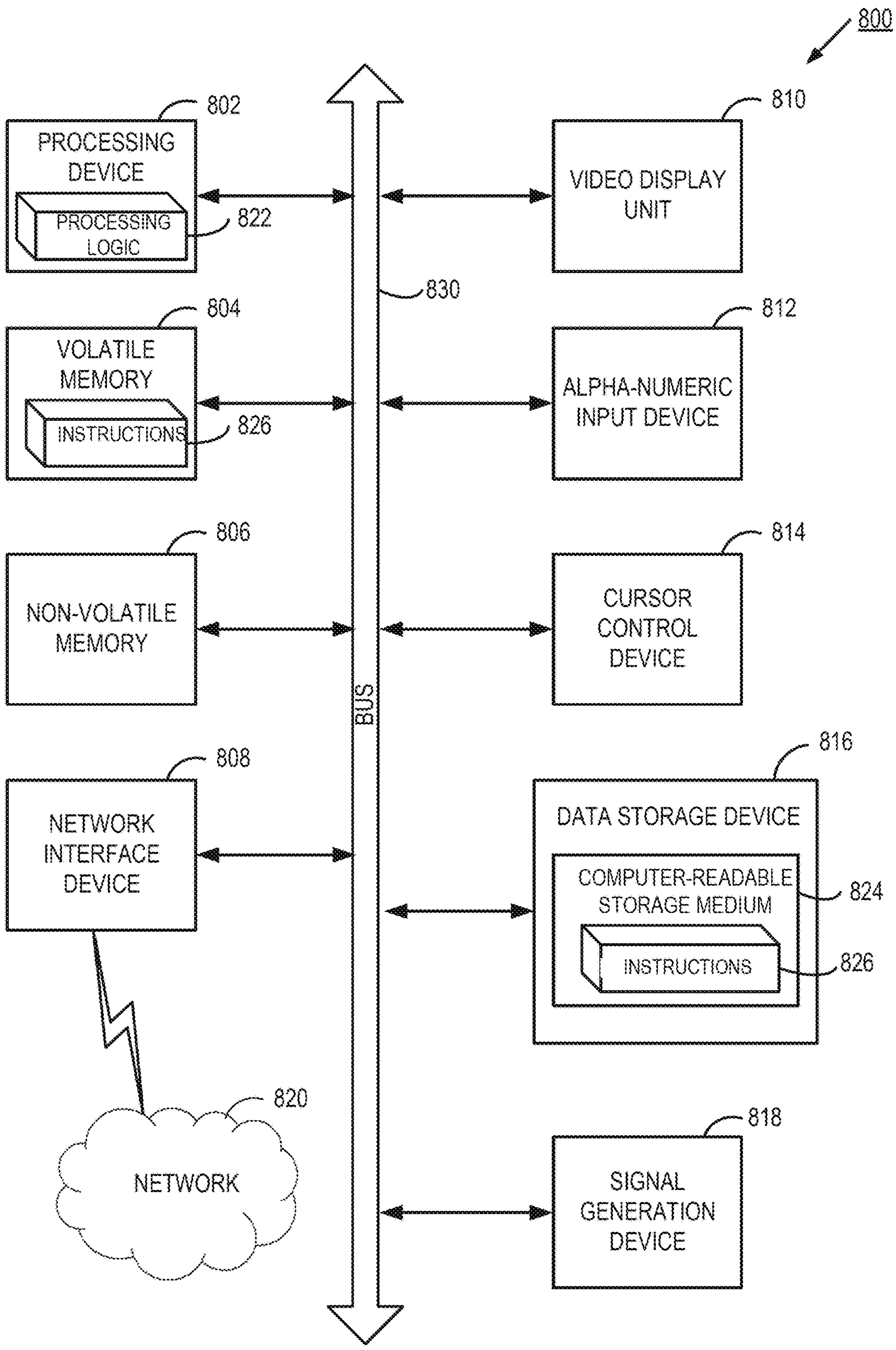
FIG. 8 is a block diagram illustrating an example computer system, in accordance with implementations of the present disclosure.

FIG. 8 is a block diagram illustrating an example computer system 800, in accordance with implementations of the present disclosure. The computer system 800 can correspond to platform 120 and/or client devices 102A-N, described with respect to FIG. 1. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a volatile memory 804 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 806 (e.g., flash memory, static random access memory (SRAM), etc.), and a data storage device 816, which communicate with each other via a bus 830.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute processing logic 822 for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 818 (e.g., a speaker).

The data storage device 816 can include a non-transitory machine-readable storage medium 824 (also computer-readable storage medium) on which is stored one or more sets of instructions 826 embodying any one or more of the methodologies or functions described herein. The instructions can also reside, completely or at least partially, within the volatile memory 804 and/or within the processor 802 during execution thereof by the computer system 800, the volatile memory 804 and the processor 802 also constituting machine-readable storage media. The instructions can further be transmitted or received over a network 820 via the network interface device 808.

In one implementation, the instructions 826 include instructions for providing fine-grained version histories of electronic documents at a platform. While the computer-readable storage medium 824 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interactions between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include the collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

causing a virtual meeting user interface (UI) to be presented during a virtual meeting between a plurality of participants;

creating, using one or more artificial intelligence (AI) models and using media streams generated by a plurality of client devices associated with the plurality of participants during a first portion of the virtual meeting as input to the one or more AI models, an initial meeting summary of the virtual meeting;

obtaining, using the one or more AI models and using: (i) the initial meeting summary of the virtual meeting, and (ii) additional media streams generated by the plurality of client devices during a second portion of the virtual meeting as additional input to the one or more AI models, an updated meeting summary of the virtual meeting; and providing the updated meeting summary for presentation to one or more of the plurality of participants.

2. The method of claim 1, wherein the one or more AI models are trained to generate meeting summaries of virtual meetings using training data comprising media streams associated with past virtual meetings.

3. The method of claim 2, wherein the one or more AI models are further fine-tuned on data pertaining to meeting summarization tasks.

4. The method of claim 1, wherein at least one of the initial meeting summary or the updated meeting summary comprises content including at least one of:

one or more action items assigned to respective one or more participants of the plurality of participants;

a list of topics discussed during the virtual meeting;

one or more documents presented via the virtual meeting UI; or one or more portions of a textual chat presented via the virtual meeting UI.

5. The method of claim 4, wherein the content of the at least one of the initial meeting summary or the updated meeting summary is associated with a first participant of the plurality of participants, and wherein the method further comprises:

creating, using the one or more AI models and using one or more of the media streams generated by the plurality of client devices or the additional media streams generated by the client devices, another meeting summary comprising additional content associated with a second participant of the plurality of participants; and providing the other meeting summary for presentation to the second participant.

6. The method of claim 1, wherein the one or more AI models comprise a speech-to-text AI model, and wherein creating the initial meeting summary of the virtual meeting comprises:

extracting, from the media streams generated by the plurality of client devices, audio data comprising one or more verbal phrases provided by at least one participant of the plurality of participants;

providing the extracted audio data as an input to the speech-to-text AI model; and obtaining one or more outputs of the speech-to-text AI model, the one or more outputs comprising a textual version of the one or more verbal phrases.

7. The method of claim 6, further comprising:

providing at least the textual version of the one or more verbal phrases as an input to a generative AI model, the generative AI model comprising at least one of a large language model, a generative adversarial network, or a variational autoencoder; and obtaining the initial meeting summary based on one or more outputs of the generative AI model.

8. The method of claim 1, wherein a first part of the meeting summary corresponding to a first portion of the virtual meeting is generated based on a transcript of the first portion of the virtual meeting, wherein the transcript is generated based on a first portion of the media streams generated during a first time period.

9. The method of claim 1, wherein a format of at least one of the initial meeting summary or the updated meeting summary is determined based on a transcript of one or more portions of the virtual meeting.

10. The method of claim 1, further comprising:

visually rendering at least the updated meeting summary via the virtual meeting UI.

11. The method of claim 1, further comprising:

responsive to receiving a second command via the virtual meeting UI, hiding the updated meeting summary from one or more participants of the plurality of participants.

12. The method of claim 1, further comprising:

determining, using the one or more AI model(s) and using a meeting transcript, that an action item is assigned to a first participant of the plurality of participants; and generating, for the first participant, a task based on the action item.

13. The method of claim 1, further comprising:

receiving, via the virtual meeting UI of at least one client device of the plurality of client devices, one or more edits to the updated meeting summary; and responsive to receiving the one or more edits, updating the virtual meeting UI of one or more additional client devices of the plurality of client devices to reflect the one or more edits.

14. The method of claim 1, further comprising:

receiving, via the virtual meeting UI, a command from a first participant of the plurality of participants to enable automatic note taking.

15. A system comprising:

a memory; and a processing device, coupled to the memory, configured to perform operations comprising:

causing a virtual meeting user interface (UI) to be presented during a virtual meeting between a plurality of participants;

creating, using one or more artificial intelligence (AI) models and using media streams generated by a plurality of client devices associated with the plurality of participants during a first portion of the virtual meeting as input to the one or more AI models, an initial meeting summary of the virtual meeting;

obtaining, using the one or more AI models and using: (i) the initial meeting summary of the virtual meeting, and (ii) additional media streams generated by the plurality of client devices during a second portion of the virtual meeting as additional input to the one or more AI models, an updated meeting summary of the virtual meeting; and providing the updated meeting summary to a first participant of the plurality of participants.

16. The system of claim 15, wherein the one or more AI models are trained to generate meeting summaries of virtual meetings using training data comprising media streams associated with past virtual meetings.

17. The system of claim 15, wherein at least one of the initial meeting summary or the updated meeting summary comprises content including at least one of:

one or more action items assigned to respective one or more participants of the plurality of participants;

a list of topics discussed during the virtual meeting;

one or more documents presented via the virtual meeting UI; or one or more portions of a textual chat presented via the virtual meeting UI.

18. A non-transitory computer readable storage medium comprising instructions that, when executed by a processing device, cause the processing device to perform operations comprising:

causing a virtual meeting user interface (UI) to be presented during a virtual meeting between a plurality of participants;

creating, using one or more artificial intelligence (AI) models and using media streams generated by a plurality of client devices associated with the plurality of participants during a first portion of the virtual meeting as input to the one or more AI models, an initial meeting summary of the virtual meeting;

obtaining, using the one or more AI models and using: (i) the initial meeting summary of the virtual meeting, and (ii) additional media streams generated by the plurality of client devices during a second portion of the virtual meeting as additional input to the one or more AI models, an updated meeting summary of the virtual meeting; and providing the updated meeting summary for presentation to one or more of the plurality of participants.

19. The non-transitory computer readable storage medium of claim 18, wherein the one or more AI models are trained to generate meeting summaries of virtual meetings using training data comprising media streams associated with past virtual meetings.

20. The non-transitory computer readable storage medium of claim 18, wherein at least one of the initial meeting summary or the updated meeting summary comprises content including at least one of:

one or more action items assigned to respective one or more participants of the plurality of participants;

a list of topics discussed during the virtual meeting;

one or more documents presented via the virtual meeting UI; or one or more portions of a textual chat presented via the virtual meeting UI.

* * * * *